(12) United States Patent
Baños Ruiz et al.

(10) Patent No.: US 12,697,935 B2
(45) Date of Patent: Aug. 4, 2026

(54) FRONT AIRBAG

(71) Applicant: Dalphi Metal Espana S.A., Vigo (ES)

(72) Inventors: Liborio Baños Ruiz, Palencia (ES);
Abraham Martinez Raya, Valladolid
(ES)

(73) Assignee: DALPHI METAL ESPANA, S.A.,
Vigo (ES)

( * ) Notice: Subject to any disclaimer, the term of this
patent is extended or adjusted under 35
U.S.C. 154(b) by 236 days.

(21) Appl. No.: 16/471,423

(22) PCT Filed: Dec. 5, 2017

(86) PCT No.: PCT/EP2017/081516
§ 371 (c)(1),
(2) Date: Jun. 19, 2019

(87) PCT Pub. No.: WO2018/114323
PCT Pub. Date: Jun. 28, 2018

(65) Prior Publication Data
US 2019/0381967 A1 Dec. 19, 2019

(30) Foreign Application Priority Data
Dec. 20, 2016 (DE) ..................... 20 2016 107 171.2

(51) Int. Cl.
*B60R 21/231* (2011.01)
*B60R 21/205* (2011.01)
(52) U.S. Cl.
CPC .......... *B60R 21/231* (2013.01); *B60R 21/205*
(2013.01)

(58) Field of Classification Search
CPC ... B60R 21/231; B60R 21/203; B60R 21/205;
B60R 2021/0009; B60R 2021/0023
See application file for complete search history.

(56) References Cited

U.S. PATENT DOCUMENTS

2005/0275201 A1* 12/2005 Schneider ............. B60R 21/231
280/731

FOREIGN PATENT DOCUMENTS

| DE | 102006056919 A1 | 6/2008 | |
|----|----|----|----|
| DE | 102008057968 A1 | 5/2010 | |
| DE | 102014001506 B4 | 8/2015 | |
| DE | 102014113277 A1 | 3/2016 | |
| DE | 102014016163 A1 | 5/2016 | |
| DE | 102015004973 A1 * | 10/2016 | ......... B60R 21/2338 |
| EP | 2718154 B1 | 4/2015 | |
| KR | 20080017718 A * | 2/2008 | |

* cited by examiner

*Primary Examiner* — Keith J Frisby
(74) *Attorney, Agent, or Firm* — Tarolli, Sundheim,
Covell & Tummino LLP

(57) ABSTRACT

A front airbag includes an outer sheath formed by a front
wall and a circumferential wall, wherein a fixing portion for
securing the front airbag tightly to the vehicle is provided on
the circumferential wall, wherein the front wall constitutes
an impact surface for a vehicle occupant and at a peripheral
edge is circumferentially connected to a first portion of a
peripheral edge of the circumferential wall. The length of the
front wall peripheral edge is equal to the length of the first
portion of the circumferential wall peripheral edge, and at
least a second and a third portion of the circumferential wall
peripheral edge are connected to each other.

15 Claims, 5 Drawing Sheets

FRONT AIRBAG

CROSS-REFERENCE TO RELATED APPLICATIONS

This application is a national stage of International Application No. PCT/EP2017/081516, filed 5 Dec. 2017, the disclosure of which is incorporated herein by reference in its entirety, and which claimed priority to German Patent Application No. 202016107171.2, filed 20 Dec. 2016, the disclosure of which is incorporated herein by reference in its entirety.

TECHNICAL FIELD

The present disclosure relates to a front airbag, especially for a passenger.

BACKGROUND

Front airbags outside the vehicle steering wheel are primarily mounted in the instrument panel in the area of the passenger seat. In a known design, the airbag includes a front wall facing the passenger in the inflated state which forms an impact surface for cushioning the vehicle occupant. Said front wall usually extends obliquely with respect to the vertical direction so that the vehicle occupant can immerse into the airbag with the head and the upper part of the body. In a known front airbag, the front wall is connected along its peripheral edge to a funnel-shaped circumferential wall which on a rear side facing away from the front wall includes an inflating mouth through which the airbag is filled and which usually also forms a fixing portion for enabling the entire front airbag to be secured to the instrument panel. In such airbags known per se the front wall substantially has a rectangular or hexagonal shape, with the corners being rounded, of course.

What is strived for is an as comprehensive protection as possible for the head and the upper body part of the vehicle occupant, even in the case of different types of frontal collisions, among others also a partly offset frontal crash. In the case of such crash, for example having an overlapping of approx. 35% and an angle of impact being outwardly offset against the longitudinal vehicle axis by 15%, especially the head of the vehicle occupant is intended to be cushioned by the front airbag.

SUMMARY

It is the object of the invention to provide an enhanced front airbag which especially in the case of frontal collisions with little overlapping offers appropriate protection for the head and the upper body of the vehicle occupant.

This object is achieved by a front airbag comprising the features of claim 1. The front airbag according to the invention has an outer sheath formed of a front wall and a circumferential wall, wherein at the circumferential wall a fixing portion for securing the front airbag tightly to the vehicle is provided. The front wall constitutes an impact surface for a vehicle occupant and at a peripheral edge is circumferentially connected, especially sewn, to a first portion of a peripheral edge of the circumferential wall. The length of the front wall peripheral edge and of the first portion of the peripheral edge of the circumferential wall are equal. At least a second portion and a third portion of the circumferential wall peripheral edge are connected to each other so as to close the circumferential wall in the circumferential direction. The front wall has a longitudinal direction related to a mounting orientation (meaning the mounted inflated state of the front airbag) which is defined by a lower end and an upper end of the front wall. Usually the longitudinal direction extends vertically in the front view to the mounted inflated front airbag. The front wall on one side has a lateral bulge with respect to the longitudinal direction and is not mirror-symmetrical with respect to the longitudinal direction. The term "lateral" refers to a view from the front to the front wall of the mounted inflated front airbag and the rims of the front wall located laterally with respect to the longitudinal direction. One of said lateral rims is bulged definitely further outwardly than the opposite lateral rim and so-to-speak forms a protruding inflated ear. This asymmetric shape increases the impact surface and improves the protection of the vehicle occupant in a partly offset crash event.

Preferably, in the mounted inflated state the bulge is located on the side of the front airbag facing the vehicle interior.

The circumferential wall is preferably substantially funnel-shaped, wherein it need not be symmetrical. The circumferential wall preferably tapers continuously toward the fixing portion, and the fixing portion is located in the area having the smallest diameter of the front airbag.

A more stable shape as well as a flatter design of the front wall can be obtained when the first portion of the peripheral edge of the circumferential wall includes a lateral bulge mirror-inverted relative to the lateral bulge of the front wall, wherein said two bulges are fixed directly to each other at their peripheries. Thus, the tensile forces inside the front airbag are not substantially varied by adding the bulge to an otherwise symmetrical shape.

The fixing portion defines a so-called fixing plane which usually also forms the opening of the airbag. In order to prevent rotation of the airbag about an axis extending substantially in the vehicle direction during inflation the front wall includes, related to the inflated mounted state, an inflation orifice formed by the fixing portion and a front wall portion directly facing the same. The front wall is asymmetric only above the front wall portion and/or there includes a bulge, thus causing the forces applied to the front wall by the inflowing gas to be symmetric.

In a preferred embodiment, in the inflated state of the front airbag a plane which will be described hereinafter extends across the center of the inflation orifice formed by the fixing portion forwardly to the front wall. The front airbag has a fixing plane formed by the fixing portion for securing on the module side. In the inflated mounted state of the front airbag, the plane extends across the center of the inflation orifice formed by the fixing portion and intersects the fixing plane in a substantially horizontal line. Said plane extends to the front wall portion directly facing the inflation orifice, with the lateral bulge of the front wall being disposed along the longitudinal direction and offset against the plane.

The lateral bulge of the front wall extends offset against the plane and thus does not extend into the plane. Usually also the main inlet direction of the inflowing gas impinging on the front wall extends along said plane. When the bulge is located in said plane, during deployment rotation of the airbag will occur which may affect the load values. If, however, the front wall is substantially symmetrical in the area of the plane, the forces introduced on the left and on the right of an imaginary center line (also representing a line of symmetry in this area) by the impinging gas are equal. In this way, no rotation of the airbag due to the inflowing gas will occur.

This arrangement especially causes the orientation of the front wall in the inflated airbag not to vary substantially vis-à-vis an airbag shape having no bulge and the front wall in the inflated airbag not to be tilted vis-à-vis that of a symmetrical airbag having the same dimensions but including no bulge.

The design according to the invention therefore may be easily adapted to different vehicle geometries. Also, asymmetric front wall shapes can be easily used without the general orientation of the front wall in the inflated state of the front airbag being substantially varied. The afore-mentioned plane extending across the center of the inflation orifice extends especially perpendicularly to the fixing plane.

In a front view onto the front wall of the mounted inflated front airbag thus the bulge is shifted along the longitudinal direction vis-à-vis the fixing portion, especially shifted upwards, so as to provide a larger restraining area for the head.

Consequently, the front wall preferably is wider in the bulge than in the area of the imaginary plane, wherein the increase in width may be approximately 20-100%, for example.

The front wall preferably includes an imaginary vertical center line, related to the mounted inflated state. Of advantage, the front wall is symmetrical with respect to the center line in the area of the plane extending across the center of the inflation orifice and is not mirror-symmetrical with respect to the center line in the area of the lateral bulge.

In a preferred embodiment, the front wall is formed, related to the mounted deployed state of the front airbag, to be mirror-symmetrical to the center line below the afore-defined plane and above said plane is not mirror-symmetrical to the center line at least in the area of the bulge. It has turned out that an increase in the front wall for cushioning a vehicle occupant in the event of an offset frontal crash is required primarily in the upper portion of the front airbag (in the mounted state). Hence it is possible to maintain the conventional design of the front airbag with a symmetric configuration in the lower portion of the front airbag, thus ensuring the stability of the airbag during inflation, and to add a bulge into the vehicle interior merely on one side in the upper area.

Preferably, along the center line each normal vector of the front wall is located in a plane which is normal to the fixing plane, consequently the front wall is not tilted vis-à-vis a symmetric front wall and has substantially the same orientation as a front wall without any bulge in an otherwise identically shaped front airbag.

The plane extending across the center of the inflation mouth intersects the front face peripheral edge outside the fixing portion at two intersections, with the length of a distance along the respective side of the circumferential wall from each of said intersections to the fixing portion preferably being substantially equal. These geometrical conditions, too, ensure that the front wall maintains the same orientation as it would have if the bulge were not provided.

The circumferential wall peripheral edge preferably is formed by the first, second and third portions as well as the fixing portion, with the fixing portion being located between the second and third portions and the second and third portions being equal in length. During fabrication of the front airbag, for example the front wall and the circumferential wall are connected to each other at the first portion of the latter and the second and third portions of the circumferential wall are superimposed and connected to each other, e.g. by sewing, welding or gluing, thus causing the fixing portion which is left open to form a circumferentially closed inflation orifice.

The circumferential wall preferably may be designed as a single coherent cut part which as a whole may be flatly spread. Of course, it is possible to compose said cut part of different separately manufactured portions and it is also imaginable to separately connect the individual portions of said cut part to the front wall. However, basically it is possible to configure the circumferential wall in the afore-described form.

Equally, the front wall may preferably be formed as one single coherent cut part, wherein it is applicable just as to the circumferential wall that the front wall may be materialized by plural separately manufactured cut parts in the real front airbag.

The front wall and the circumferential wall preferably are separate from each other, i.e. in the state not yet fastened to each other they can be flatly spread, which facilitates manufacture of the individual cut parts. The geometry of the respective peripheries can be chosen in the typical case so that segments of the peripheries to be fastened to each other in portions can be connected by flatly superimposing the corresponding portions of the front wall and the circumferential wall. It is advantageous for this purpose when not only the length of the front wall peripheral edge and of the circumferential wall peripheral edge are in exact conformity, but also the curvatures are not extremely different. Especially in the area of the bulge, exact conformity of the curvatures of the superimposed portions is preferred.

BRIEF DESCRIPTION OF THE DRAWINGS

Hereinafter the invention shall be illustrated in detail by way of an embodiment and with reference to the enclosed drawings, wherein.

DETAILED DESCRIPTION

Figure 1:
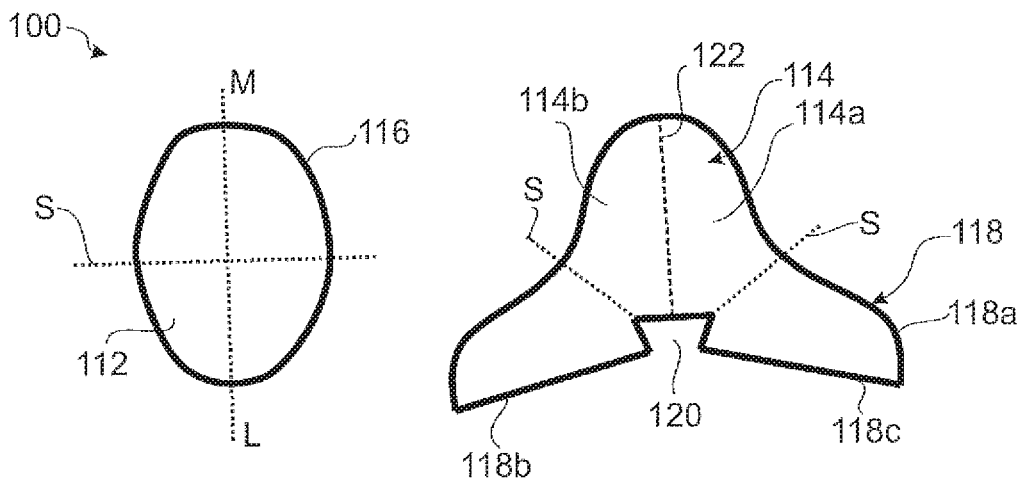
FIG. 1 shows a cut for a conventional symmetric front airbag according to prior art.
Figure 2:
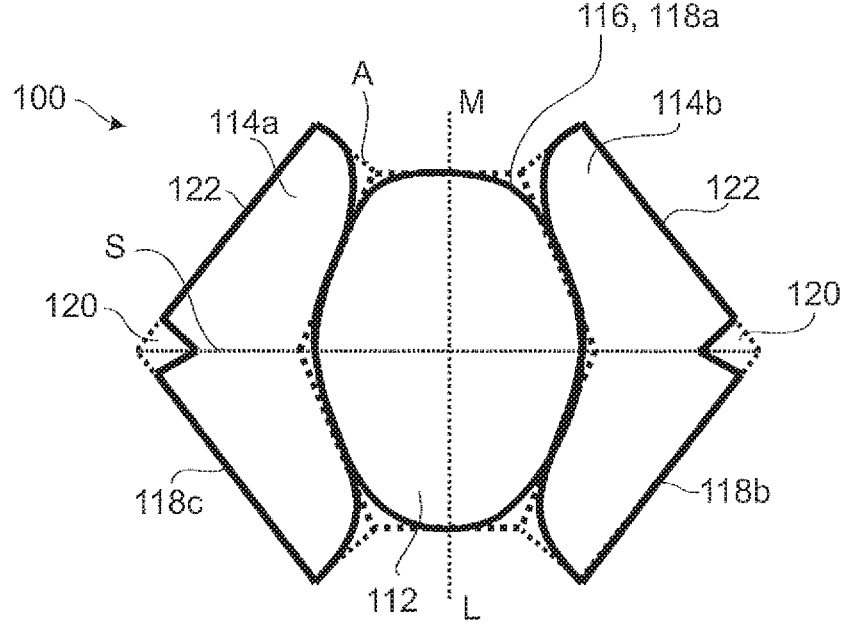
FIG. 2 shows the cut from FIG. 1 in a different arrangement of the two cut parts for the circumferential wall.

FIGS. 1 and 2 illustrate a cut of a front airbag 100 according to the prior art.

The outer sheath of the front airbag 100 is composed of a front wall 112 and a circumferential wall 114. In the representation chosen in FIG. 1 each of the cuts of the front wall 112 and the circumferential wall 114 is shown as a single one-piece cut part. For fabricating the front airbag 100 from the front wall 112 and the circumferential wall 114 a peripheral edge 116 of the front wall 112 is circumferentially connected to a first portion 118a of a peripheral edge 118 of the circumferential wall 114. Moreover, a second portion 118*b* of the circumferential wall peripheral edge 118 is connected to a third portion 118*c* thereof.

Centrally between the second portion 118*b* and the third portion 118*c*, in the peripheral edge 118 a fixing portion 120 is spared which in the finished front airbag 100 serves for securing the entire front airbag 100 tightly to the vehicle and which at the same time forms an inflation orifice for taking in the filling gas. A front airbag 100 in the usual case is secured tightly to the vehicle on a module housing which is secured in an instrument panel 19 of the vehicle so that the front airbag 100 may serve for protecting a passenger (as indicated in FIG. 5).

FIG. 2 shows a different representation of the flatly spread cuts of the front wall 112 and the circumferential wall 114 in which the circumferential wall 114 is divided along a separating line 122 into two mirror-image symmetrical parts forming two opposite sides 114*a*, 114*b* in the inflated front airbag 110. The separating line 122 extends across the fixing portion 120 so that the latter is equally divided into two parts. The sides 114*a*, 114*b* of the circumferential wall 114 are located on the right and on the left next to the centrally arranged front wall 112, with the first peripheral edge portion 118*a* of the circumferential wall 114 facing the area of the peripheral edge 116 of the front wall 112 to which it is later going to be connected.

The front airbag 100 shown in FIGS. 1 and 2 in the inflated state is symmetrical with respect to a vertically extending center line M which in the Figures centrally divides the front wall 112 along its longitudinal direction L into two mirror-symmetrical halves. The longitudinal direction L corresponds to a mounting orientation of a direction defined by a lower end and an upper end of the front wall 112 so that the upper end of the front wall 112 in the Figures constitutes the upper point of the front airbag 100 in the inflated state even later in the mounted position within the vehicle.

Figure 5:
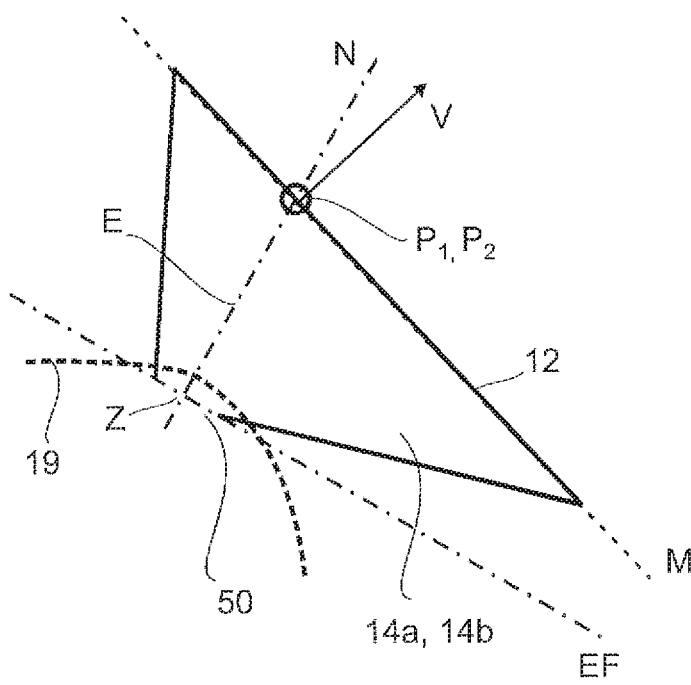
FIG. 5 shows a schematic sectional view of the front airbag according to the invention in the mounted and inflated state for illustration of the geometrical conditions.

An imaginary line S extends from the one half of the fixing portion 120 via the first side 114*a* of the circumferential wall 114, the front wall 112 and the second side 114*b* of the circumferential wall 114 to the second half of the fixing portion 120 (cf. also FIG. 5). In the view illustrated in FIG. 2, the line S constitutes a continuous distance. If the cut parts are divided as in FIG. 1, the distance S is distributed over the short side of the front wall 112 as well as over the minimum distances from the fixing portion 120 to the first portion 118*a* of the peripheral edge 118 of the circumferential wall 114. In the embodiment shown in FIG. 2, the distance S also extends across the fixing portions 120 which later are going to form the inflation orifice.

Around all cut parts a general outer contour A is drawn which is marked by dotted lines. Said outer contour A predefines the basic dimensions of a known and frequently used so-called SOS airbag (square bags) having a substantially rectangular or hexagonal symmetrical impact surface. By varying the dimensions of the front wall 112 and the two sides 114*a*, 114*b* of the circumferential wall 114 in which the symmetry with respect to the center line as well as the symmetry of the contours of both sides 114*a*, 114*b* of the circumferential wall 114 are maintained, such airbag can be easily and flexibly adapted to different mounting situations, wherein always a symmetrical airbag is obtained.

Figure 3:
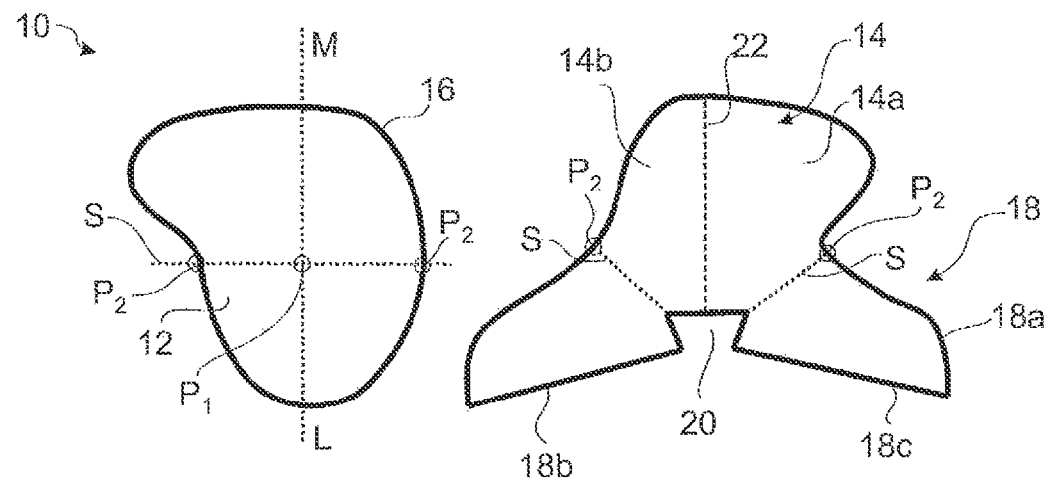
FIG. 3 shows a cut for a front airbag according to the invention in an arrangement of the cut parts analogously to FIG. 1.
Figure 4:
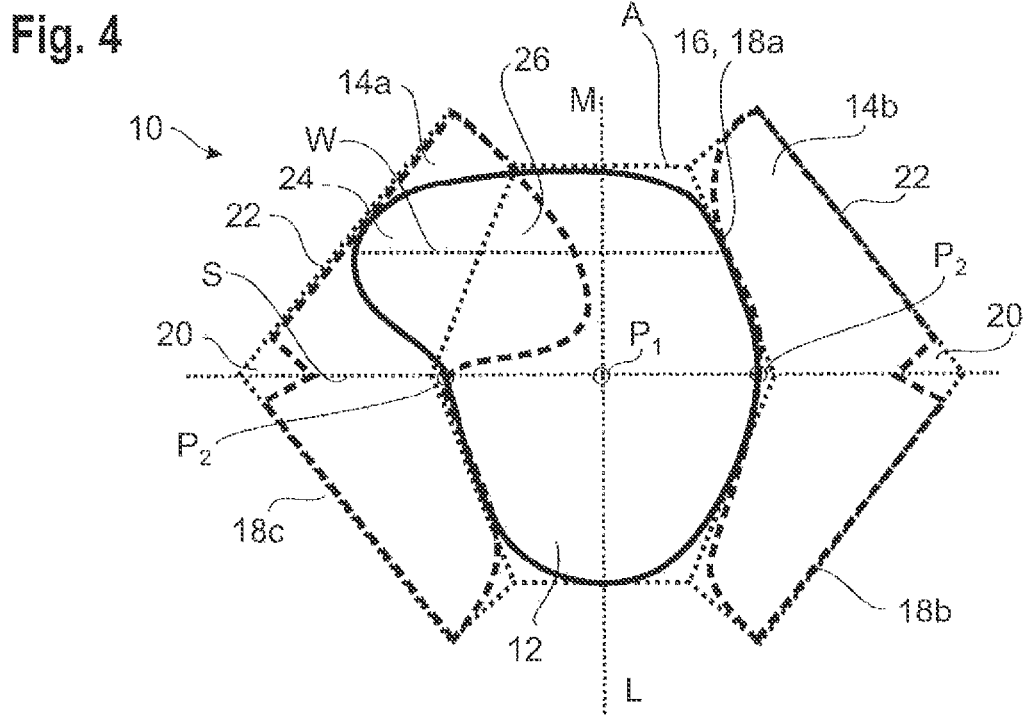
FIG. 4 shows the cut from FIG. 3 in an arrangement of the cut parts analogously to FIG. 2.

FIGS. 3 and 4 illustrate the same views as FIGS. 1 and 2 for the front airbag 10 according to the invention. In FIG. 4 the front wall 12 is symbolized by a continuous line for illustrative reasons, whereas the two sides 14*a*, 14*b* of the circumferential wall 14 are drafted by broken lines. In the configuration according to the invention, the front wall 12 is not completely but only in portions mirror-symmetrical with respect to the center line M and the longitudinal direction L.

In the upper area of the front wall 12 in FIGS. 3 and 4 a one-sided lateral bulge 24 is formed which projects from the residual contour of the front wall 12 normal to the longitudinal direction L. In this example, this is the only difference from the substantially oval front wall 112 of the front airbag 100 known from the state of the art. As compared to this, the width of the front wall 12 normal to the longitudinal direction L is increased by approx. 20% to 100% in the area of the bulge 24.

In the pertaining first side 14*a* of the circumferential wall 14 a mirror-symmetrical bulge 26 is formed. Otherwise, also the first side 14*a* of the circumferential wall 14 has the same shape as in prior art. It has to be noted that according to FIG. 4 the individual cut parts are shown to be superimposed and, accordingly, the bulges 24, 26 are not yet sewn to each other.

As is shown in FIG. 4, the bulges 24, 26 are overlapping when the circumferential wall 14 is divided along the separating line 22 and the cut parts are laid in the arrangement as described in FIG. 2. This illustrates that the peripheries 16, 18 of the front wall 12 and the circumferential wall 14 still can be connected to each other just as in prior art, wherein merely additionally the two bulges 24, 26 in the front wall 12 and in the circumferential wall 14 are connected to each other along the outer contours thereof. The front wall peripheral edge 16 still has the same length as the first portion 18*a* of the circumferential wall peripheral edge 18. The two other portions 18*b*, 18*c* of the circumferential wall 14 are connected to each other while sparing the fixing portion 20. The interconnected bulges 24, 26 in the inflated front airbag 10 are resulting so-to-speak in an inflated ear laterally protruding from the front wall 12 which is otherwise symmetrical to the longitudinal direction L.

The general outer contour A of the front airbag 10 according to the invention is identical to the one known from prior art. The general shape of the outer contours of the front wall 12 and the circumferential wall 14 therefore can be easily modified according to the same principles as for the known SQS airbag.

Also, in the case of the front airbag 10 according to the invention, an imaginary line S can be defined, as described in the foregoing. Said imaginary line S also here describes in the typical case the shortest distance extending from the fixing portion 20 via the first side 14*a* of the circumferential wall 14, the front wall 12 and the second side 14*b* of the circumferential wall 14 back to the fixing portion 20.

It has turned out that the additional volume of the bulge 24, 26 does not influence the orientation of the front airbag 10 in the inflated state, unless the bulge 24 is located in a plane E. Said plane E extends across the center Z of the inflation orifice 50 (cf. FIG. 5) and preferably extends perpendicularly to the fixing plane EF and intersects the fixing plane EF in a substantially horizontal line. According to FIG. 5, said horizontal line extends perpendicularly to the plane of projection across the point Z.

The plane E usually extends also in the main inlet direction of the gas into the front airbag. This means that the portion of the front wall 12 directly facing the inflation orifice to which the plane extends also constitutes the area which absorbs the main load during deployment. In this portion, the front wall is symmetrical with respect to the center line M so that the forces are acting uniformly on the airbag.

In the examples shown here the bulge 24 is located above the imaginary line S and the plane E in the FIGS. 3 to 7. The line S may intersect the plane E or may extend at least in portions along the plane E. In the area located below the line S and the plane E the front wall 12 is symmetrical with respect to the longitudinal direction L so that in this case the center line M also forms a line of symmetry for this area of the front wall 12. In the area of the front wall 12 located above the line S or the plane E, the front wall is not mirror-symmetrical with respect to the longitudinal direction L and the center line M, however, as the bulge 24 is provided on one side only.

As is indicated in FIG. 5, an intersection $P_1$ of a normal line N relative to the fixing plane EF with the front wall 12 is located on the center line M. In the configuration according to the invention, too, along the center line M a normal vector V of the front wall 12 is located in a plane which is perpendicular to the fixing plane EF. The plane E intersects the front wall peripheral edge 16 outside the fixing portions 20 at two intersections P2, with the length of a distance along the respective side 14a, 14b of the circumferential wall 14 from each of said intersections $P_2$ to the fixing portion 20 being substantially equal. In the area of the bulge 24 imaginary intersecting lines W perpendicularly to the center line M (cf. FIG. 4) defining the width of the front wall 12 are not divided centrally by the center line M.

Figure 6:
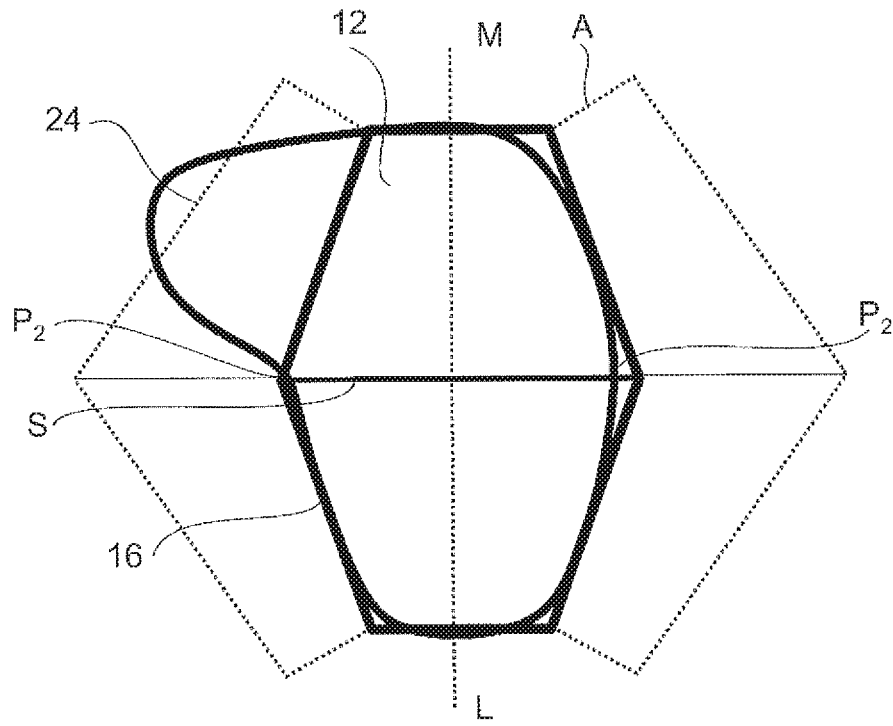
FIGS. 6 and 7 show a schematic illustration of the geometry for the front wall of a front airbag according to the invention for different airbag geometries.
Figure 7:
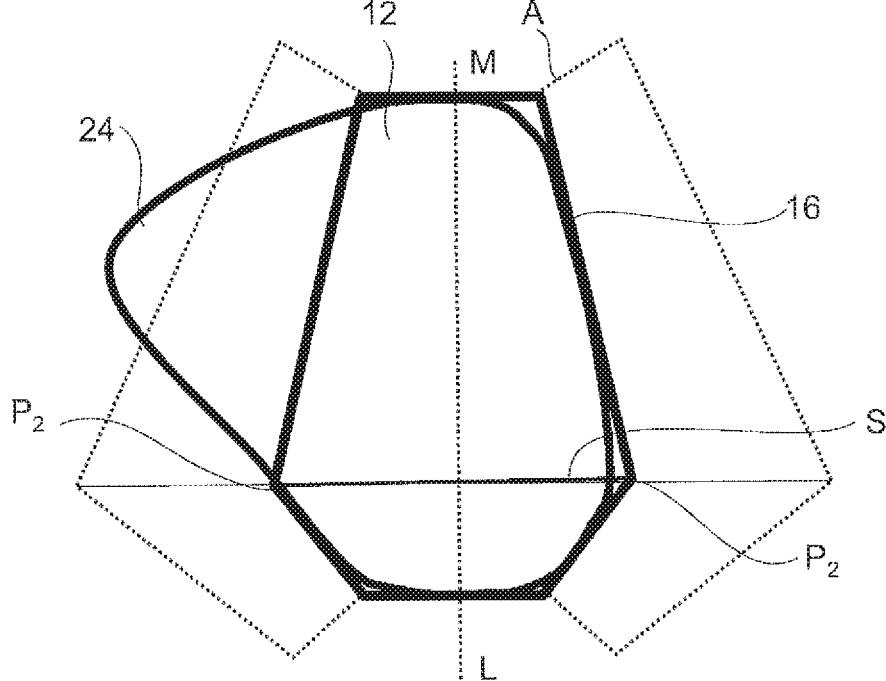

As is illustrated by FIGS. 6 and 7, the bulge 24 (and a corresponding bulge 26 of the circumferential wall 14) may be designed in various ways. It has turned out to be advantageous for the orientation of the front airbag 10 in the inflated state, however, when the bulge 24 does not vary the shape of the front wall as compared to the conventional airbag in the area of the plane E (related to the inflated state) or the line S (related to the spread state of the cut parts), i.e. is formed exclusively above and/or below the plane E and, resp., the line S.

Figure 8:
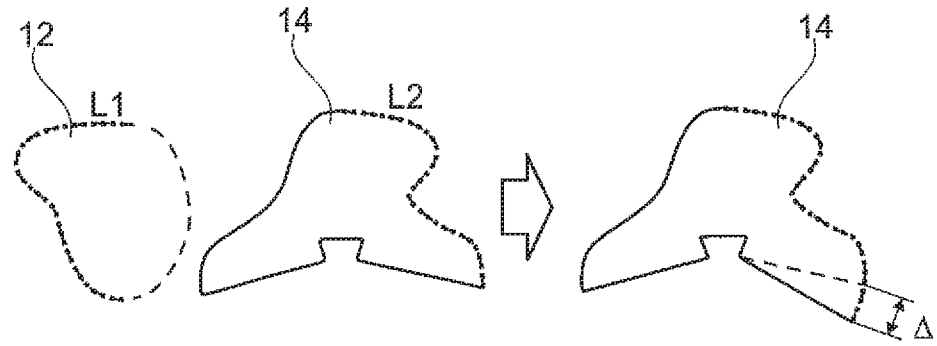
FIG. 8 shows a possible further step in the manufacture of the front airbag according to the invention.

FIGS. 6 and 7 also show a comparison of the design of the bulge 24 in the front wall 12 for differently designed basic shapes of the underlying SQS airbag, wherein the imaginary line S need not centrally divide the front wall 12 with respect to the longitudinal direction (cf. FIG. 7). It might be necessary to adapt the volume of the front airbag 10 so as to enhance the shape of the front airbag 10 in the inflated state. In this case, the circumferential wall 14 may, as indicated in FIG. 8, be extended by a little piece Δ by adding a circle segment of approx. 5° to 10° in the area of the third portion 18c of the circumferential wall peripheral edge 18 starting from the fixing portion 20. In this way, possible deviations of the lengths $L_1$ and $L_2$ of the peripheries 16, 18a from the front wall 12 and the circumferential wall 14 in the area of the bulges 24, 26 can be compensated.

The front airbag 10 is arranged so that the bulge 24 is directed into the vehicle interior so as to protect a vehicle occupant especially in the event of an offset frontal impact.

In this case, the connection of individual peripheral edge portions 16, 18a, 18b, 18c is performed, for example, by sewing, but it could as well be realized by gluing or welding. In particular cases it is also imaginable to form individual portions of the front wall 12 and the circumferential wall 14 integrally with each other. Especially, as a matter of course, each of the cut parts of the front wall 12 and of the circumferential wall 14 either may be cut in one piece in the form shown in FIG. 3 or may be composed of any number of individual cut portions.

However, it is applicable to both the front wall 12 and the circumferential wall 14 that without any fastening along the peripheries and separately from each other, i.e. in a state in which the peripheries 16, 18 thereof have not yet been connected to each other, they can be completely flatly spread. Hence, they have no areas three-dimensional per se which would project from a planar base with portions being stitched down so as to provide three-dimensional areas. Such three-dimensional areas would also be formed, if a triangular portion were cut out of a cut part and the rims formed were sewn to each other. None of the parts of the front airbag according to the invention is intended to have such three-dimensional structure.

In this application an idealized airbag shape is described. In a real front airbag configured according to the ideas according to the invention presented here, the geometrical conditions are developed less clearly, as a matter of course, and may deviate from the indications given in this application for the idealized airbag. It is also obvious that for a predetermined three-dimensional final shape of the front airbag 10 there is an infinite number of options to vary the exact shape of the individual cut parts without deviating from the principle of the invention. Therefore, only one specific example is shown here. All other variants resulting in an identical shape of the front airbag 10 are equally comprised by the invention, however.

The invention claimed is:

1. A passenger front airbag configured to be mounted in an instrument panel on a passenger side of a vehicle, comprising a front wall and a circumferential wall, wherein the circumferential wall comprises a fixing portion configured to secure the front airbag to the instrument panel in a mounted state of the front airbag so that the front airbag can receive inflation gas directed along a main inlet direction, wherein the front wall constitutes an impact surface for a vehicle occupant, the front wall having a peripheral edge connected to a first portion of a peripheral edge of the circumferential wall, wherein the length of the front wall peripheral edge is equal to the length of the first portion of the circumferential wall peripheral edge, wherein the circumferential wall peripheral edge comprises second and third portions that are connected to each other, wherein the front wall has a centerline that extends longitudinally between a lower end and an upper end of the front wall, the centerline being configured to extend vertically in the vehicle in an inflated condition of the front airbag, wherein the front wall has a non-mirror-symmetrical portion with respect to the centerline defined by a lateral bulge on one side of the front panel, the front wall having a mirror-symmetrical portion with respect to the centerline below the non-mirror-symmetrical portion, and wherein the circumferential wall comprises an inflation orifice formed by the fixing portion and through which inflation gas is directed in the main inlet direction, wherein the fixing portion is configured to lie along a fixing plane of the instrument panel in a mounted state of the front airbag, the fixing plane being transverse to an intersecting plane that extends across a center of the inflation orifice in the main inlet direction and intersects the fixing plane along a horizontal line, wherein the front wall and the circumferential wall are configured so that the mirror-symmetrical portion of the front wall is positioned longitudinally below the intersecting plane, facing the inflation orifice, and the mirror-symmetrical portion of the front wall receives the inflation gas flowing into the front airbag in the main inlet direction during deployment so that the forces of the inflation gas act uniformly on the front airbag.

2. The front airbag recited in claim 1, wherein the front airbag is configured so that the non-mirror-symmetrical portion of the front wall is positioned longitudinally above the intersecting plane.

3. The front airbag recited in claim 1, wherein the front wall and circumferential wall are configured as flat panels.

4. The front airbag recited in claim 1, wherein the front wall is formed by one single coherent cut part.

5. The front airbag recited in claim 1, wherein the first portion of the peripheral edge of the circumferential wall includes a lateral bulge that is mirror-symmetrical to the lateral bulge of the front wall.

6. The front airbag recited in claim 1, wherein the intersecting plane extends to a portion of the front wall directly facing the inflation orifice, wherein the front wall is wider in the bulge than where the- intersecting plane meets the front wall.

7. The front airbag recited in claim 1, wherein the front wall and the circumferential wall are configured so that an imaginary line constitutes the shortest distance along the circumferential wall on a first lateral side of the front airbag from the fixing portion to where the intersecting plane meets the front wall, across the front wall along the intersecting plane, and from where the intersecting plane meets the circumferential wall on a second lateral side of the airbag, opposite the first lateral side of the airbag, to the fixing portion.

8. The front airbag recited in claim 1, wherein the intersecting plane extends perpendicularly to the fixing plane.

9. The front airbag recited in claim 1, wherein the front wall and circumferential wall are configured so that in the mounted state with the front airbag in a deployed condition, along the center line, normal vectors of the front wall are located in a plane that is perpendicular to the fixing plane.

10. The front airbag recited in claim 1, wherein the intersecting plane intersects the front wall peripheral edge at two intersections and the length of a distance along the respective side of the circumferential wall from each of the intersections to the fixing portion is substantially equal.

11. The front airbag recited in claim 1, wherein the peripheral edge of the circumferential wall is formed by the first, second, and third portions, as well as the fixing portion, and the fixing portion is located between the second and third portions, with the second and third portions being equal in length.

12. The front airbag recited in claim 1, wherein the circumferential wall is formed by one coherent cut part.

13. The front airbag recited in claim 1, wherein in an inflated state of the front airbag, the lateral bulge of the front wall is on a lateral side of the front airbag that faces a vehicle interior.

14. The front airbag recited in claim 1, wherein the first portion of the peripheral edge of the circumferential wall includes a lateral bulge, and wherein the front wall and circumferential wall are configured such that when the front wall and circumferential wall overlie one another in a condition set for being connected together, the lateral bulges substantially extend in opposing directions relative to one another.

15. The front airbag recited in claim 1, wherein the front wall and circumferential wall are configured such that when the front wall and circumferential wall overlie one another in the condition set for being connected together, the lateral bulges do not directly overlie one another.

* * * * *